(12) United States Patent
Srinivasan et al.

(10) Patent No.: US 11,972,409 B2
(45) Date of Patent: Apr. 30, 2024

(54) RETRANSMISSION OF ENVIRONMENTAL INDICATIONS FOR LOST PREVENTION AT A CHECKOUT TERMINAL

(71) Applicant: NCR Voyix Corporation, Atlanta, GA (US)

(72) Inventors: Vikram Srinivasan, North Billerica, MA (US); Joshua Migdal, Wayland, MA (US); Malay Kundu, Lexington, MA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 16/022,593

(22) Filed: Jun. 28, 2018

(65) Prior Publication Data
US 2019/0005475 A1    Jan. 3, 2019

Related U.S. Application Data

(60) Provisional application No. 62/526,335, filed on Jun. 28, 2017.

(51) Int. Cl.
*G06Q 20/18* (2012.01)
*G06Q 20/20* (2012.01)
*G07G 3/00* (2006.01)

(52) U.S. Cl.
CPC .......... *G06Q 20/18* (2013.01); *G06Q 20/202* (2013.01); *G06Q 20/203* (2013.01);
(Continued)

(58) Field of Classification Search
CPC .... G06Q 20/18; G06Q 20/202; G06Q 20/203; G06Q 20/208; G06Q 20/209; G07G 3/006
See application file for complete search history.

(56) References Cited

U.S. PATENT DOCUMENTS 5,196,686 A * 3/1993 Leister ............... G06K 7/10861
705/400
6,243,447 B1 * 6/2001 Swartz ................ H04M 1/2755
379/93.12
(Continued)

FOREIGN PATENT DOCUMENTS

WO    WO-2005104050 A1 * 11/2005 ........... G06Q 20/343

OTHER PUBLICATIONS

NCR Corporations, "NCR Self-Checkout Innovation: Where Convenience Meets Security" YouTube, <https://www.youtube.com/watch?v=Gkt1fR7xxHI&t=53s>, Jan. 10, 2018 (Year: 2018).*

*Primary Examiner* — Nathan A Mitchell
*Assistant Examiner* — Jessica E Sullivan
(74) *Attorney, Agent, or Firm* — Schwegman Lundberg & Woessner, P.A.

(57) ABSTRACT

A system and method for converting an environmental signal surrounding the checkout terminal to a transmission signal is disclosed. The system verifies the accuracy of the transaction at the checkout terminal by analyzing the transmission signal produced by a signal transmission device, which activates upon a detection of a predetermined environmental signal caused around the vicinity of the checkout terminal. The detection of the predetermined environmental signal is performed by a sensor apparatus placed at the checkout terminal which monitors and senses environmental signals during the transaction of an item being purchased at a store.

18 Claims, 7 Drawing Sheets

(52) U.S. Cl.
CPC ......... *G06Q 20/208* (2013.01); *G06Q 20/209* (2013.01); *G07G 3/006* (2013.01)

(56) References Cited

U.S. PATENT DOCUMENTS

| | | | |
|---|---|---|---|
| 7,516,888 B1 | 4/2009 | Kundu et al. | |
| 7,631,808 B2 | 12/2009 | Kundu et al. | |
| 8,146,811 B2 | 4/2012 | Kundu et al. | |
| 8,448,858 B1 | 5/2013 | Kundu et al. | |
| 10,133,895 B2 * | 11/2018 | Bruni | G06K 7/10821 |
| 2010/0059589 A1 * | 3/2010 | Goncalves | G06K 9/00771 |
| | | | 235/383 |
| 2011/0147454 A1 * | 6/2011 | Matsuhisa | G06K 7/1404 |
| | | | 235/455 |
| 2012/0187191 A1 * | 7/2012 | Olmstead | G06K 7/10861 |
| | | | 235/462.13 |
| 2013/0293596 A1 * | 11/2013 | Atkins | G09G 5/10 |
| | | | 345/690 |
| 2015/0060552 A1 * | 3/2015 | Rambler | G06K 7/10574 |
| | | | 235/470 |
| 2016/0283565 A1 * | 9/2016 | Taylor | G07G 1/0036 |
| 2017/0310743 A1 * | 10/2017 | Aoyama | G01R 27/04 |
| 2018/0096567 A1 * | 4/2018 | Farrow | G07G 3/003 |
| 2019/0180264 A1 * | 6/2019 | Crooks | G07G 1/0063 |
| 2020/0311360 A1 * | 10/2020 | Lee | G07G 1/0063 |

* cited by examiner

RETRANSMISSION OF ENVIRONMENTAL INDICATIONS FOR LOST PREVENTION AT A CHECKOUT TERMINAL

CROSS REFERENCE TO RELATED APPLICATIONS

This application is a non-provisional application which claims the benefit to U.S. Provisional Application No. 62/526,335 filed on 28 Jun. 2017.

TECHNICAL FIELD

The present invention relates generally to a security system and method to prevent fraudulent activities occurring at a self-checkout terminal. More specifically, the present invention describes a retransmission of environmental signals for preventing fraudulent activities at a checkout terminal.

BACKGROUND

Point of Sale (POS) devices are frequently used in retail stores to itemize and register the sale of items for purchase by customers. POS devices typically comprise of a special purpose computer terminal, display screen, cash drawer, and other peripheral devices such as flatbed barcode scanners, handheld barcode scanners, receipt printers, de-tagging devices, customer oriented displays, pole displays, and many others. Many include signals intended to give the cashier or the customer feedback that a correct, or incorrect, operation was performed. For example, flatbed barcode scanners, whose purpose is to read the barcodes off of items for purchase, typically emit an audible tone, or beep, upon successful scanning of a barcode. Furthermore, these devices often include a visual signal of some type, such as a flash or a color change from green to red or vice-versa, to indicate that a successful, or in some cases not successful, recording of the barcode has been performed.

Other devices have their own sets of signals. Though they vary significantly in the details of the signaling, they all tend to be either audible or visual in nature, and they all tend to either signal a successful or unsuccessful operation of their designed function.

Some devices, such as receipt printers and cash drawers, do not emit a signal intentionally to draw the attention of an observer to its successful operation. Yet, their successful operation can emit an audible or visual signal just by virtue of their operation. For instance, when the cash drawer opens from the POS, it will emit a sound and change the visual characteristics of the POS. When a receipt printer prints out the receipt, a typically white receipt is observable as well as the sounds the printers makes while operating.

All of these signals (also referred to as "indications", e.g. visual indication and audible indication), both those intentionally designed to give feedback and those unintentionally giving feedback in the course of their operation, are helpful to both cashier and customer alike in ascertaining the state and success of the transaction.

Just as these signals can be used to ascertain the success of the transaction, they can provide valuable feedback for determining if something out of the ordinary is occurring. A primary concern of retails in general is inventory shrink due to either theft of merchandise or careless itemization (i.e. ringing up) of items for purchase at the checkout. For example, the audible tone emitted by the flatbed barcode scanner can be used to determine whether an item has been properly rung up or not. If there is no audible tone, or beep, produced by the scanner, it can be deduced that the item in question was not properly registered as an item for sale. This information is frequently used by cashiers to try the operation again, and to keep trying until the operation is successful. Sometimes, however, the cashier will not keep trying, or will fail to observe that no audible tone was produced when they attempted a scan, and they will pass the item unscanned into the output, bagging, or other area in which purchased items are kept. That items would then leave the store not having been paid for.

There are a multitude of inventions that seek to prevent the theft, loss, or unintentional mis-scanning of items by customers, cashiers, and other involved in the transaction process. Asset tags, inventory management systems, as well as sophisticated computer vision based approaches have all been used to detect, stop, and deter theft and unintentional inventory shrinkage at the checkout.

Systems described in previous patents numbers, commonly owned by the applicant, U.S. Pat. Nos. 7,516,888, 7,631,808, 8,146,811, 8,448,858, inter alia, use video analytics to track items at the checkout and ensure each item is rung up properly. These systems automatically analyze the video feeds, observing which items are available for purchase, and compare that to the transaction details to ensure all items available for purchase have a corresponding record in the transaction data.

This transaction data can come from a plethora of sources. The POS itself prints out a record of all items transacted. Back end, back office servers also frequently get all the transaction details in order to store it centrally for the retailer's use. Other sources of data are also frequently used.

The signals discussed above are all potentially available for use as well. However, a number of issues make using these signals challenging. First, they are not easily received by such loss prevention systems. Second, many of the signals are designed to be helpful to the people at the checkout. As such, they are not in a form easily digestible to a computer system, nor are they easily transmittable to such systems without significant and potentially unacceptable alteration of these signaling systems from their intended purpose.

The purpose and scope of this invention is to address these issues in being able to use the various environmental signals present at the checkout to facilitate the successful operation of sophisticated loss prevention systems that are based on correlating transaction data with video.

SUMMARY

The subject matter of this application may involve, in some cases, interrelated products, alternative solutions to a particular problem, and/or a plurality of different uses of a single system or article.

According to one aspect, A signal retransmission device for converting an environmental signal at a checkout terminal to a transmission signal is provided. The signal retransmission device comprises a sensor apparatus that detects the environmental signal present around the checkout terminal. The sensor apparatus is in communication with a controller and registers a change in voltage upon detection of the environmental signal. The device further comprises a transmission device which generates the transmission signal as a response to the environmental signal detected by the sensor apparatus. The transmission device is in communication with a controller which analyzes the change in voltage to the detected environmental signal based on a predetermined voltage change associated with a predetermined transmission signal to determine the transmission signal. A storage unit electronically stores a plurality of the predetermined change to transmission associations.

According to another aspect, a system for verifying a transaction at a checkout terminal is provided. The system verifies the transaction by converting an audible environmental signal to a transmission signal, where the checkout terminal is in communication with a processor and a memory. The system may comprise an audio sensor to detect the audible environmental signal generated during the transaction of an item at the checkout terminal. The audible environmental signal is generated by the checkout terminal when the item is scanned by a barcode scanner at the checkout terminal by a user. The audio sensor may be operatively in communication with the processor. Further, the system may comprise a transmission device that generates the transmission signal as a response to the audible environmental signal detected by the audio sensor. Lastly, the system may comprise a camera device, operated by a computing device, which is positioned to record the transmission signal. The computing device may verify the transaction by analyzing the recorded transmission signal.

DESCRIPTION OF THE DRAWINGS

These and other advantages of the present invention may be readily understood with the reference to the following specifications and attached drawings.

DETAILED DESCRIPTION

Figure 1:
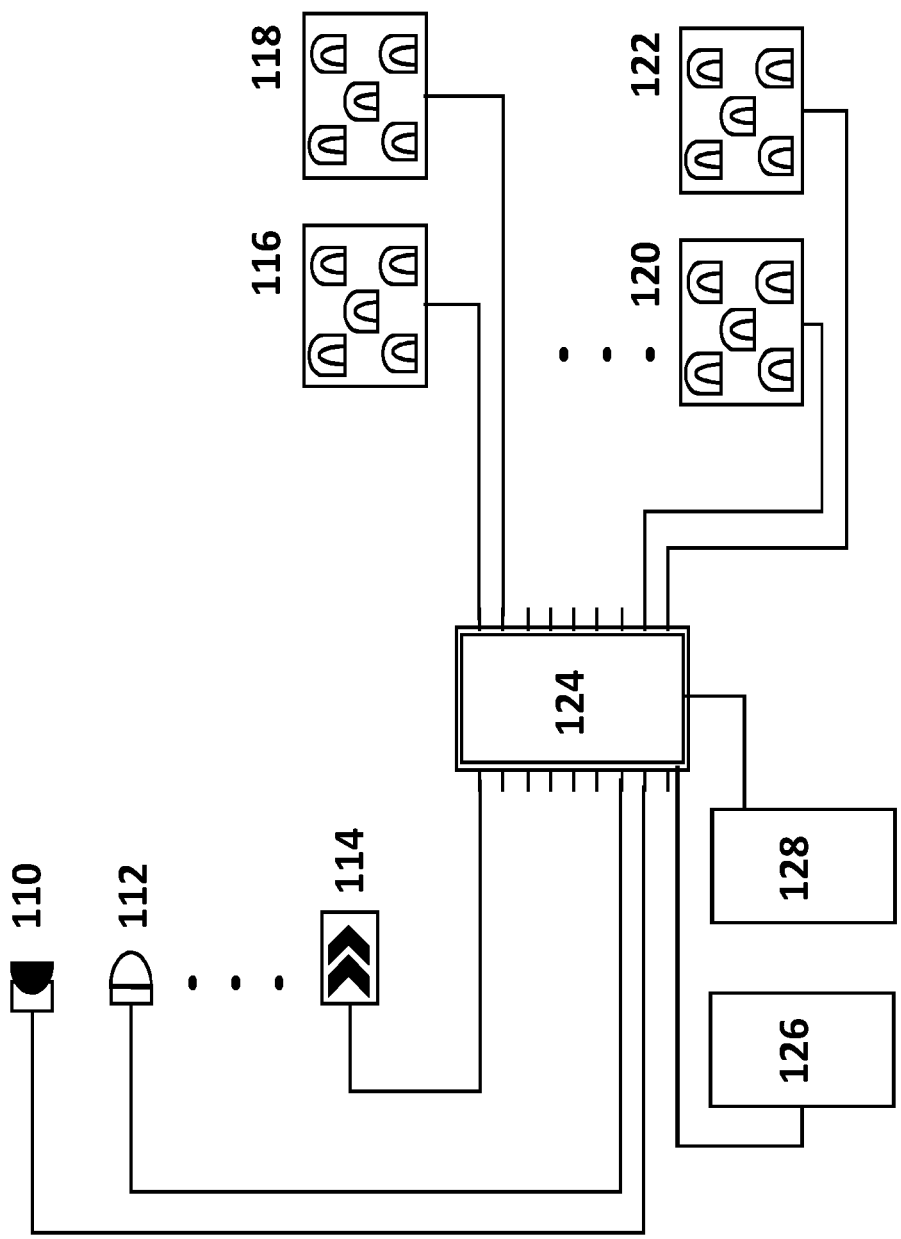
FIG. 1 provides an exemplary embodiment of the system for converting environmental indications at a checkout terminal to light signal.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In referring to the description, specific details are set forth in order to provide a thorough understanding of the examples disclosed. In other instances, well-known methods, procedures, components, and materials have not been described in detail as not to unnecessarily lengthen the present disclosure.

Preferred embodiments of the present invention may be described hereinbelow with reference to the accompanying drawings. In the following description, well-known functions or constructions are not described in detail because they may obscure the invention in unnecessary detail. No language in the specification should be construed as indicating any unclaimed element as essential to the practice of the embodiments. For this disclosure, the following terms and definitions shall apply:

It should be understood that if an element or part is referred herein as being "on", "against", "in communication with", "connected to", "attached to", or "coupled to" another element or part, then it can be directly on, against, in communication with, connected, attached or coupled to the other element or part, or intervening elements or parts may be present.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code stored to a computer readable medium, such as a memory device (if any is necessary) to perform the function, regardless of whether performance of the function is disabled or not enabled (e.g., by an operator-configurable setting, factory trim, etc.).

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "exemplary" means serving as a non-limiting example, instance, or illustration. Likewise, the terms "e.g." and "for example" set off lists of one or more non-limiting examples, instances, or illustrations.

The term "network" as used herein includes both networks and inter-networks of all kinds, including the Internet, and is not limited to any particular network or inter-network. Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

Camera contemplated herein may include, but are not limited to, DSLR, non-SLR digital cameras (e.g., but not limited to, compact digicams and SLR-like bridge digital cameras (also known as advanced digital cameras), and SLR-like interchangeable lens digital cameras), as well as video recorders (e.g., but not limited to, camcorders, analog cameras and IP cameras, and the like; a device that can provide a video feed of any duration, such as a DVR; a portable computing device having a camera, such as a tablet computer, laptop computer); and the like.

Image contemplated herein may be any digital image format capable of being interpreted by a computer or computing device. Examples of image files contemplated herein include, but are not limited to JPEG, GIF, TIFF, PNG, Bitmap, RAW, PNM, WEBP, and the like.

Barcode contemplated herein may be of any type of machine-readable medium, including but not limited to a barcode, a QR code, two-dimensional bar code, a prescribed font, optical character recognition (OCR) characters, Radio Frequency Identification (RFID), Near-Field Communication (NFC), Bluetooth technology, alphanumeric characters, non-alphanumeric characters, symbols, facial recognition and the like. Barcode scanner contemplated herein may include, but are not limited to, a laser-based scanner, an optical-based scanner, and the like.

Video contemplated herein may be any data format capable of being interpreted by a computer or computing device. Examples of image files contemplated herein include, but are not limited to MP4, AVI, MPG, M4V, FLV, MOV, WMV, VOB, and the like.

Various operations may be described as multiple discrete operations in turn, in a manner that may be helpful in understanding embodiments; however, the order of description should not be construed to imply that these operations are order dependent.

Spatially relative terms, such as "under" "beneath", "below", "lower", "above", "upper", "proximal", "distal", and the like, may be used herein for ease of description and/or illustration to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable. Such descriptions are merely used to facilitate the discussion and are not intended to restrict the application of disclosed embodiments.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

Some embodiments of the present invention may be practiced on a computer system that includes, in general, one or a plurality of processors for processing information and instructions, RAM, for storing information and instructions, ROM, for storing static information and instructions, a database such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed invention may be practiced. It is to be understood, however, that those skilled in the art may develop other structural and functional modifications without departing from the novelty and scope of the instant disclosure.

The system disclosed herein may comprise one or more computers or computerized elements, in communication with one another, working together to carry out the different functions of the system. The invention contemplated herein may further comprise a non-transitory computer readable media configured to instruct a computer or computers to carry out the steps and functions of the system and method, as described herein. In some embodiments, the communication among the one or more computer or the one or more processors alike, may support a plurality of encryption/decryption methods and mechanisms of various types of data.

The system may comprise a computerized user interface provided by one or more computing devices in networked communication with each other. The computer or computers of the computerized user interface contemplated herein may comprise a memory, processor, and input/output system. In some embodiments, the computer may further comprise a networked connection and/or a display screen. These computerized elements may work together within a network to provide functionality to the computerized user interface. The computerized user interface may be any type of computerized interfaces known in the art capable of allowing a user to input data and receive a feedback therefrom. The computerized user interface may further provide outputs executed by the system contemplated herein.

Database and data contemplated herein may be in the format including, but are not limiting to, XML, JSON, CSV, binary, over any connection type: serial, Ethernet, etc. over any protocol: UDP, TCP, and the like.

Computer or computing device contemplated herein may include, but are not limited to, virtual systems, Cloud/remote systems, desktop computers, laptop computers, tablet computers, handheld computers, smartphones and other cellular phones, and similar internet enabled mobile devices, digital cameras, a customized computing device configured to specifically carry out the methods contemplated in this disclosure, and the like.

Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

The system described herein may implement a server. The server may be implemented as any of a variety of computing devices, including, for example, a general purpose computing device, multiple networked servers (arranged in cluster or as a server farm), a mainframe, or so forth. The server may be installed, integrated, or operatively associated with the system. The server may store various data in its database.

The system described herein may be implemented in hardware or a suitable combination of hardware and software. In some embodiments, the system may be a hardware device including processor(s) executing machine readable program instructions for analyzing data, and interactions between the components of the system. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) may include, for example, microprocessors, microcomputers, microcontrollers, digital signal processors, central processing units, state machines, logic circuits, and/or any devices that manipulate signals based on operational instructions. Among other capabilities, the processor(s) may be configured to fetch and execute computer readable instructions in a memory associated with the system for performing tasks such as signal coding, data processing input/output processing, power control, and/or other functions. The system may include modules as software units executing on a processor.

The system may include, in whole or in part, a software application working alone or in conjunction with one or more hardware resources. Such software applications may be executed by the processor(s) on different hardware platforms or emulated in a virtual environment. Aspects of the system, disclosed herein, may leverage known, related art, or later developed off-the-shelf software applications. Other embodiments may comprise the system being integrated or in communication with a mobile switching center, network gateway system, Internet access node, application server, IMS core, service node, or some other communication systems, including any combination thereof. In some embodiments, the components of system may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The system may include a variety of known, related art, or later developed interface(s) (not shown), including software interfaces (e.g., an application programming interface, a graphical user interface, etc.); hardware interfaces (e.g., cable connectors, a keyboard, a card reader, a barcode reader, a biometric scanner, an interactive display screen, etc.); or both. The system may operate in communication with a data storage unit and a transmitter.

Generally, the present disclosure provides a system and method for converting environmental indicators (i.e. an external signal) at a checkout terminal (i.e. Point of Sale (POS) device) to array(s) of LED lights signals for lost prevention at a store. The system may monitor the checkout terminal and its surroundings/environment to gather any environmental indicators or signals, such as sound/audio signal, light/visuals signals, and movement/motion. Certain environmental indicators, such as, for example, a beeping sound as an item is scanned over a barcode scanner at a checkout terminal, a motion of the shopper/cashier as he/she scans the item over the barcode scanner, and/or signal lights of the checkout terminal itself, may be associated with a certain information/situation (e.g., louder beep as 'error' in scanning, rapid double beep as 'error' in scanning, red blinking light as a signal for an intervention from a clerk, etc.). These predetermined association between the environmental indicator and the associated information may be predetermined and stored at a data storage unit as a database. In some embodiments, the associated information may be designated a code or a signal which, in turn represents the information/situation. For example, a beeping sound at a certain intensity (i.e. decibel) may be preconfigured to be associated with a pass signal indicating no error has occurred or no intervention (i.e. prevention of unscanned item being checked out) is needed.

Turning now to FIG. 1, a Signal Retransmission Device (SRD) is provided. The SRD may sense the environmental signal(s) and convert or retransmit it to different types of signal. FIG. 1 provides a high-level architecture of the SRD system for converting environmental indicator at a checkout terminal to light signal (i.e. LED toggle pair device). The SRD may comprise one or more ambient sensors for sensing environmental signals and/or detecting various signals from the environment. These sensors may be electrically coupled to a microcontroller 124 which detects changes in voltage caused by the ambient sensors, and may interpret the changes in voltage as various signals, and may actuate one or more of its connected transmission devices, such as a light signaling device 116 118 120 122 (i.e. LED toggle pair device). While voltage is used herein as an example, changes in the state of the detected environmental signals may be interpreted for actuating the trans mission device. The state information may be digital, analog, voltage, resistance, current, capacitance, and the like.

In some embodiments, the SRD system may comprise one or more sensor apparatus, such as an audio sensor 110, a light sensor 112, and a motion sensor 114, to monitor or detect signals, auditory, visual, or otherwise, that occur around the checkout terminal (i.e. environmental signal). The environmental signal may be those that are produced either intentionally or unintentionally by the individuals at the checkout terminal. By way of examples, the environmental signal may indicate the state of the transaction, such as 'scanned', 'error', 'unscanned', and the like. As described above, such environmental signal(s) may be preconfigured to be associated with a situation, information, or status of transaction and stored by a data storage unit 128 in communication with the SRD system. These environmental signals may include barcode scanner beeps and flashes, receipt printer activity (not shown), POS terminal activity, asset de-tagging use, and many others.

The sensor apparatus, such as the audio sensor 110, the light sensor 112, and the motion sensor 114 may be connected to a logic circuit that validates the signal received by the microcontroller 124. The microcontroller 124 may be in communication with the data storage unit 128 and/or a memory 126. Based on the preconfigured association and its validation, the transmission device (such as, the light signaling devices 116 118 120 122) may be actuated. The transmission device may comprise one or more LED light arrays that operate in either the visual or infrared (IR) spectrum. The visual signal (i.e. light) transmitted by the transmission device may be received or detected by a camera device 210 (shown in FIG. 2). The camera device 210 may be a ceiling-mounted CCTV camera. These are ubiquitous in retail establishments and are already widely used for loss prevention purposes.

Figure 2:
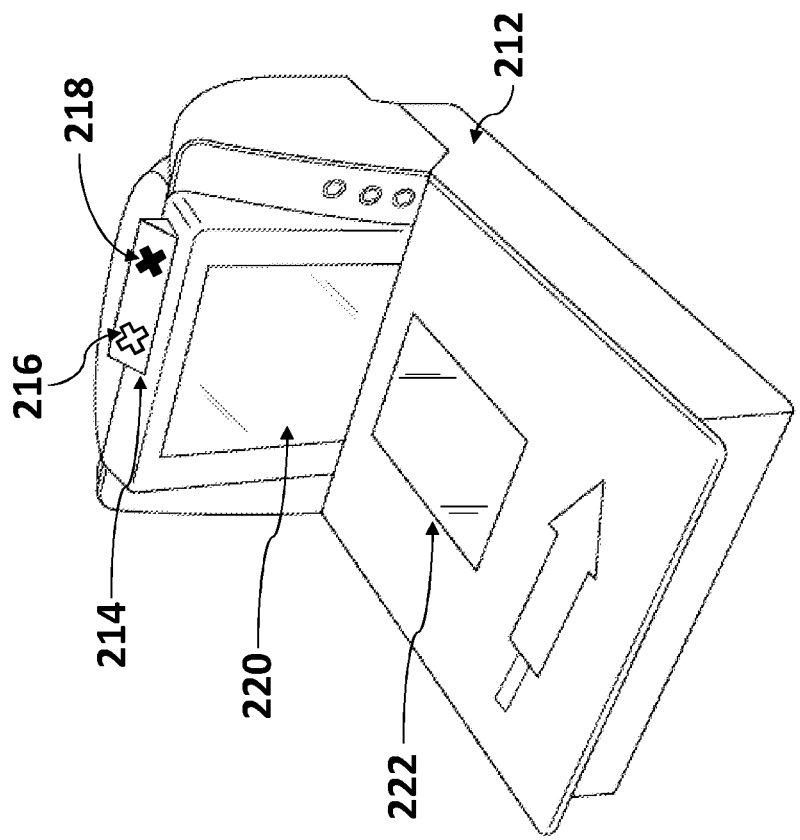
FIG. 2 provides an exemplary embodiment of the system showing an LED Toggle Pair device implemented at a checkout terminal.
Figure 2:
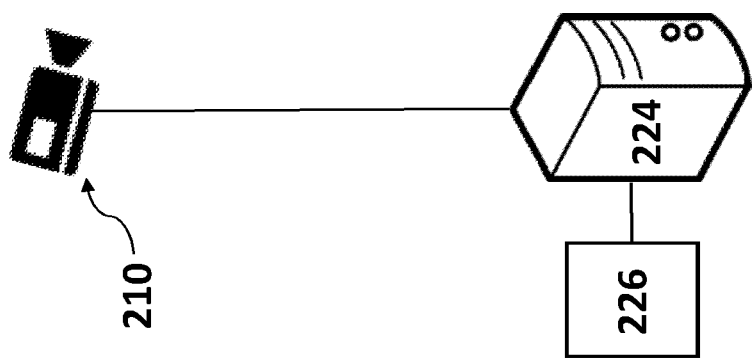

FIG. 2 provides an exemplary embodiment an LED Toggle Pair device placed at a checkout terminal. The LED toggle pair 214 (used as the transmission device) transmits a signal by switched which pair of the LED toggle pair 214 are lit between the left light signal 216 and the rights light signal 218. The SRD system may be integrated with the checkout terminal 212. The checkout terminal 212 may comprise a barcode scanner operatively connected to the checkout terminal located behind glass panels 220 and 222. Further, the checkout terminal 212 may be equipped with the one or more sensor apparatus, such as an audio sensor 110, a light sensor 112, and a motion sensor 114.

Figure 3:
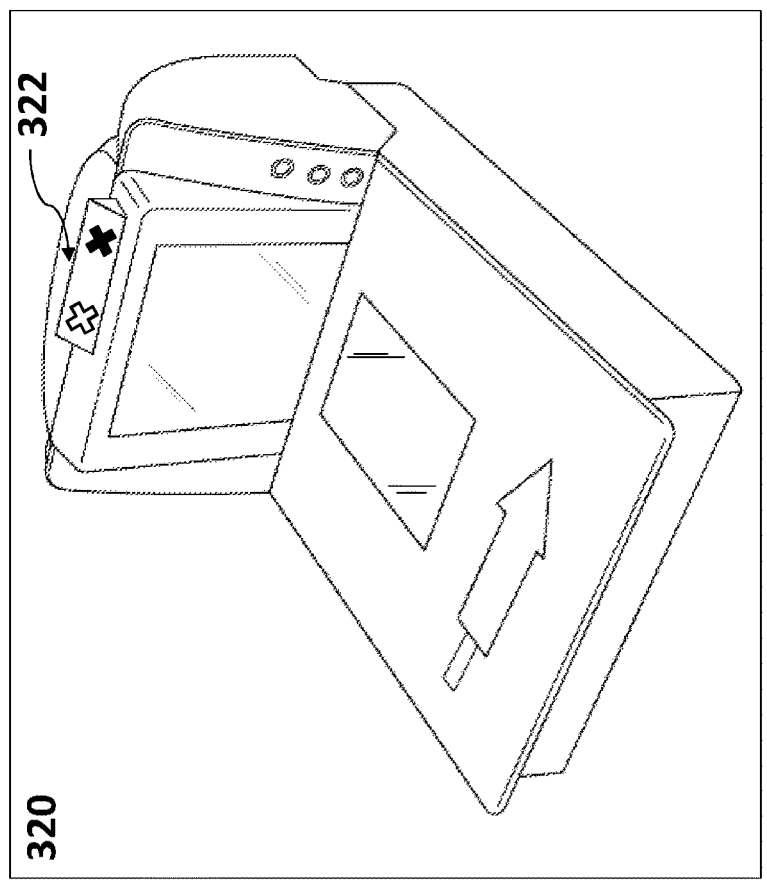
FIG. 3 provides an exemplary demonstration of the Toggle Pair device as an item is scanned at a checkout terminal.
Figure 3:
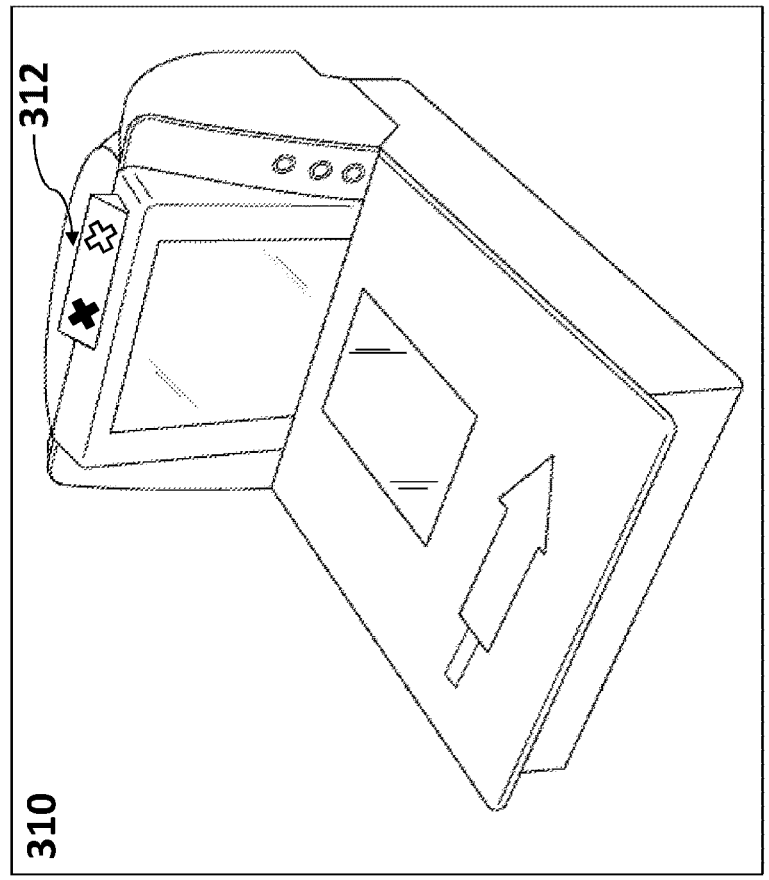

FIG. 3 demonstrates an exemplary operation of the presently disclosed system for converting environmental indicators at a checkout terminal. Upon the SRD system sensing a beep from the checkout terminal, for example, in a response to a successful scan of an item, the LED toggle pair 214 may switch which light is on and which is off between the left light signal 216 and the rights light signal 218. The changes of light signals from the LED toggle pair 214, in turn, may be detected by the camera device 210, then transmitted to the visual differentiator device 226, and the visual differentiator device 226 detects the switch in illumination between the pair of the LED toggle pair 214. By way of example, the checkout terminal shown at 310 shows the LED toggle pair 312 showing the right light signal lit and left light signal off. Alternatively, the checkout terminal 320 illustrates the LED toggle pair 322 showing the right light signal off and the left light signal lit. Any permutation of the light illumination may be provided by the LED toggle pair. As it would be readily understood by those having ordinary skill in the art, binary code may be generated between on and off of the particular light illumination pattern of the LEG toggle pair. As such, a number of illuminators (LED toggle light) of the LED toggle pair may be more than a pair (two) to encompass a larger amount of communication ability, thus being capable of providing a complex binary code.

The camera device 210 may be connected to a visual differentiator device 226 that records the video or a series of images from the camera. The visual differentiator device 226 may be a software module operated by a central computing device 224. The visual differentiator device 226 may be programmed with an instruction to extract the signal sent from the transmission device 214 (i.e. showing left light signal 216 and right light signal 218) and recorded by the camera device 210. The extracted signal may then be used as transaction data by loss prevention system to correlate transaction data with the video activity of items being transacted and, in some cases, not properly transacted. Various transmission device configurations are described below that have various beneficial properties that balance simplicity, signal strength, and error detection.

Signaling semaphores have been around for centuries. Some of the earliest examples are waving banners from a hilltop, or sending signals to one another by reflecting sunlight off a surface to signal someone far away. With the advent of trains and mechanized travel, signaling semaphores in the form of signs and lights have been used to control traffic flow and let operators and other individuals know the state of the system and when it is safe to proceed.

More recently, in the retail space, attempts have been made at relaying a signal via an optical transmission device. For example, such devices tee off the serial signal from a flatbed barcode scanner, and transmit an optical flash from a transmission device which is recorded by the overhead CCTV camera. This device has a number of deficiencies compared to the device described herein. First, it requires tapping into the serial connection of the scanner. It does not sense an ambient environmental signal such as an audible tone or light flash. This is often enough of a barrier for retailers to not want to implement it. Furthermore, such scanners have many different interfaces, a notable one being USB, which is far more difficult to tee off, rending the device inoperable. Furthermore, the signal transmitted is an optical flash which has several limitations that will be described in detail herein. And, finally, there is no automated system that will receive and extract the signal to be used with downstream components such as the loss prevention systems described previously. Rather, the signal is to be interpreted by individuals watching the security video. In this way, the related device is more like CCTV-camera overlay systems, which tee off a serial connection and overlay the resulting text directly onto the CCTV video by manipulating the video feed after it leaves the camera and before it is recorded by a video recorder device.

Sensor Apparatus

The sensor apparatus (SA) is a device which detects an environmental signal, such as an audible beep or visual flash, and converts it into, for example, an electromagnetic pulse by varying the voltage level across a potential. There are any number of devices that can perform this operation, including small microphones, CMOS sensors, diodes, etc. The types of sensor apparatus may be selected based on what environmental signal is to be monitored.

To monitor an audible source, a microphone may be utilized as the sensor apparatus. To monitor a sound (i.e. a beep), a piezoelectric device may be employed directly to the speaker in order to detect the pressure change caused by the sound (i.e. beep tone).

To monitor a visual signal, such as a screen, light indicator, or flashing component, various components can be used. A CMOS sensor digitizes the scene into a raster image directly. Furthermore, a light emitting diode (LED) with reverse polarity bias can be used as a light level sensor. This, combined with a translucent optical filter can be used to detect light of a specific color. This is useful for sensing a flash of a particular color, or for detecting when a region of color changes from one color to or from the filter color. For instance, the SA may be designed to recognize a state change from the color green to the color red.

The SA may be connected to a logic circuit which performs various functions. In one embodiment, it may validate the signal detected by the SA. The validation process can be as simple as a pass-through of the signal, a thresholding of the signal by some predetermined or learned threshold, or by some time analysis of the signal sensed by the SA to detect a state change indicative of the environmental signal the system has been calibrated to sense. As such, the SRD system may be exposed to the environment to calibrate and set a standard of environmental signals normally occurring at the environment where the checkout terminal is placed. The logic circuit may direct the actuation of the transmission device.

Transmission Device

The transmission device (TD), such as the light signaling devices 116 118 120 122, may transmit signal or operate as a response to the received environmental signal detected by the sensor apparatus. The camera device then may record the operation of the transmission device. In some embodiments, the transmission device may comprise a single light emitting diode (LED) which is actuated by a logic circuit of the microcontroller. The LED can be actuated in a number of different ways. It can be actuated to light up to a degree commensurate with the intensity of the received signal. For instance, if the SA is configured to receive sound signals, and if a small sound is heard, the LED can be actuated to emit a dim light. If a loud sound is heard, the LED will send a bright light. The ranges of signal intensity (i.e. sound intensity) may be predetermined to be associated with a certain information as discussed above.

Such retransmission of signal from one form to another provides the system an ability to verify the accuracy of the original signal or to prevent a missed signal. For example, a sound generated at the checkout terminal (i.e. a beep) may indicate that the scanned item is in error (i.e. a wrong item, unscanned, scanning error, etc.). That sound generated by the checkout terminal may be detected by the sensor apparatus and enable the transmission device to generate a different signal to be verified by the visual differentiator device. As such, an error that may have been missed or unverified may be resolved without a human intervention (i.e. a store clerk physically being present to examine the item being scanned) at the checkout terminal.

In another embodiment, the LED may be actuated via a threshold from the logic circuit on the signal received from the SA. For instance, if the SA is configured to listen for a beep, upon sensing a beep, the LED is actuated for a brief, configurable amount of time. That is, the LED flashes based upon the SA and logic circuit indicating a beep was received.

In some embodiments, to compensate for very bright environments (i.e. high noise level), or large distances from TD to the camera device, or to compensate for attenuation of the signal due to misalignment of TD and the camera device, multiple LEDs can be put together in an array to create a brighter transmitting signal or the intensity of the LED can be controlled to be distinguishable from the environment or detectable by the camera device. Furthermore, the LED or LED array may not emit light in the optical frequency. Instead, the LEDs can emit in the infrared spectrum. This has the benefit of being inconspicuous to the individuals present at the checkout, while still being capable of being received by the camera.

In some embodiments, the LED array can comprise of multiple different colors, in order to create a signal at varying hues. In this embodiment, any possible color can be sent by the TD and received by the camera device. To increase the chances the signal will be received adequately by the camera, a different configuration of the TD is possible. In this embodiment, a pair of LED lights are used. Instead of flashing the pair to indicate a signal as previously described, each of the pair of LED lights may operate in tandem, with one always being on while the other is always off. To transmit a signal, which comprises 1-bit of information, the pair inverts, such that one turns on and the other turns off simultaneously. In this way, the signal transmitted is the change from on-off to off-on (or vice-versa) of the pair of LED lights operating in tandem. The benefits of this are two-fold. First, more LEDs are used to transmit the signal, thereby increasing the signal to noise ratio. Second, there is a baseline sent with every bit, so that receive errors can be detected immediately and dealt with.

LED Toggle Pair

Figure 4:
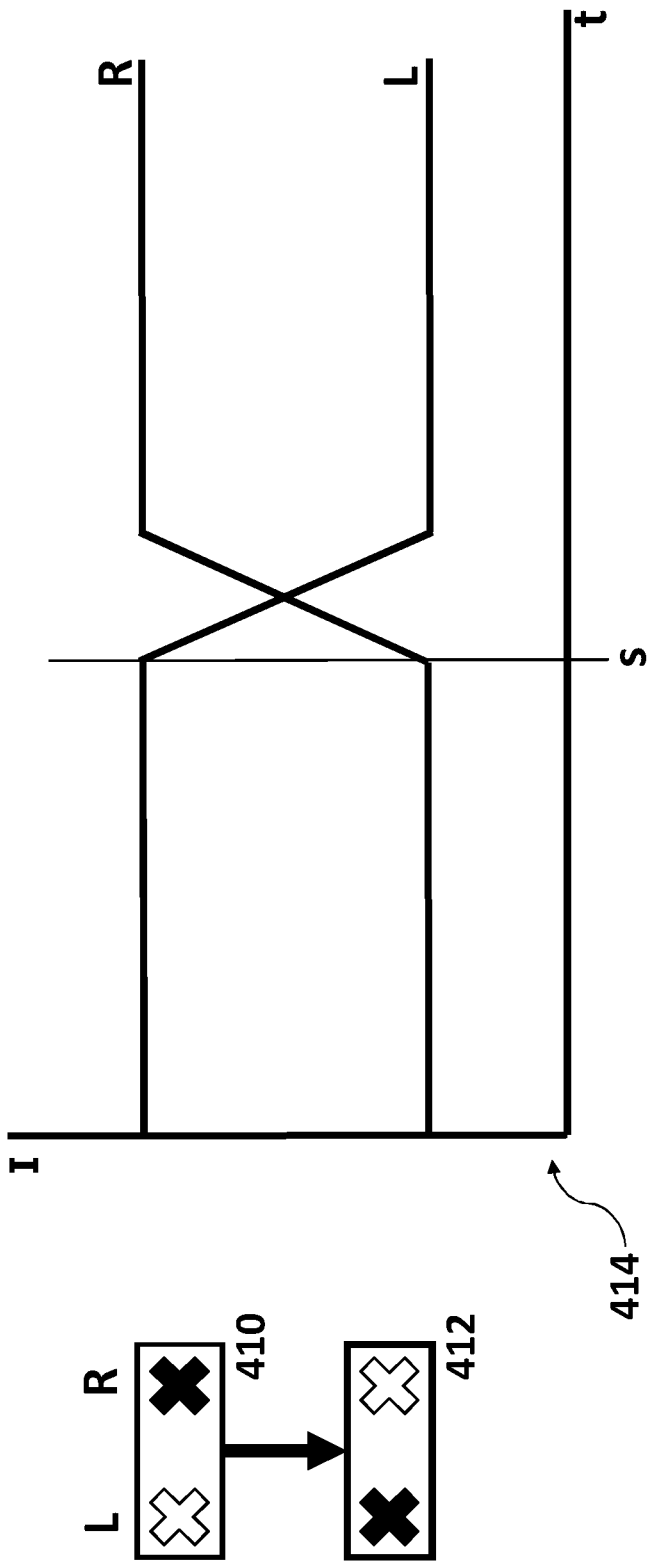
FIG. 4 provides a chart describing an illumination of the left (L) and the right (R) toggle light array as the environmental signal is detected.
Figure 5:
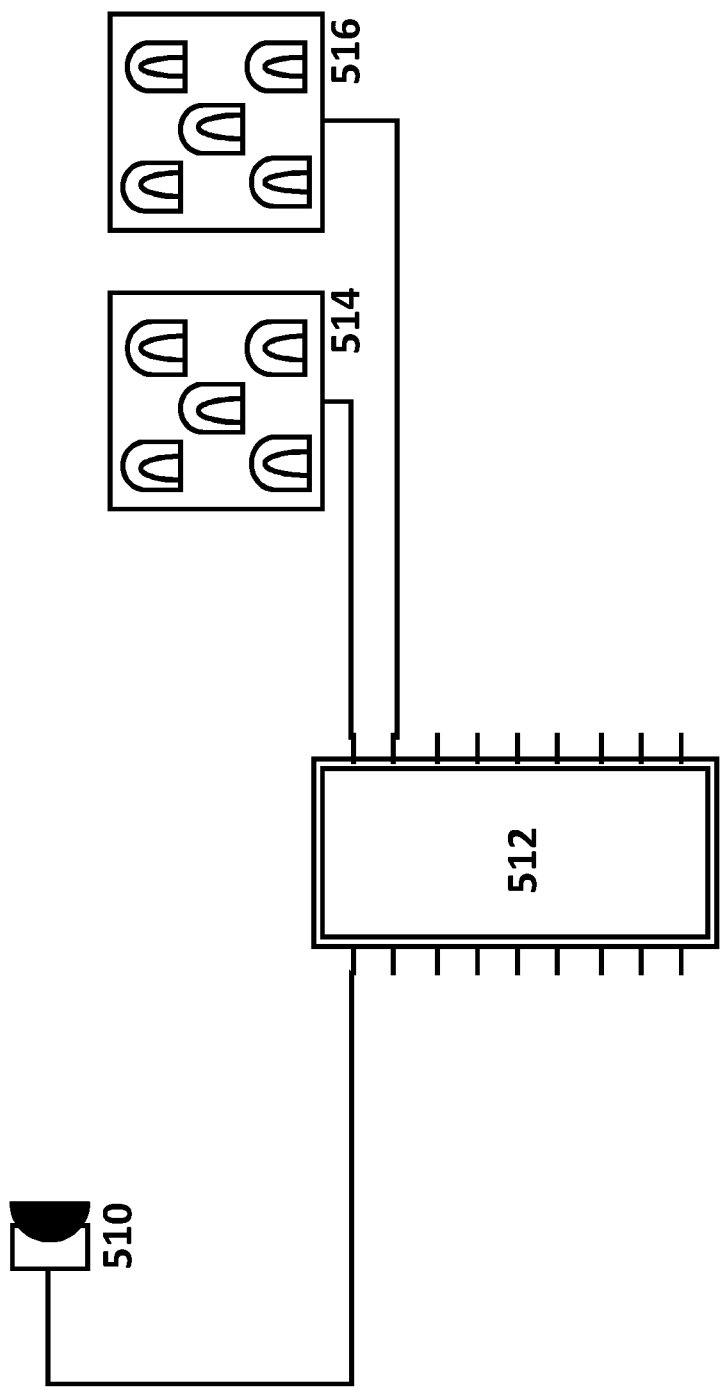
FIG. 5 provides an exemplary embodiment of the system architecture for toggle light array operation using an environmental signal sensing device.

Turning now to FIGS. 4 and 5, The LED toggle pair may operate as one unit to transmit the signal. In the toggle pair, one of the pair is on, while the other is off. To transmit the signal, the LED toggle pair switches which set is on and which is off. FIG. 4 showcases an illumination (I at y-axis) vs. time (t at x-axis) diagram 414 of the LED light toggle pair in the presence of a detected environmental signal. In some embodiments, one of the LED toggle pair is always on. Upon detection of an ambient signal in the environment, the LED toggle pair switches which one of the LED pair is on and which is off. In this way, the signal is transmitted optically. The LED toggle pair 410 412 are lit between the left light signal and the rights light signal. In FIG. 4, L and R are the luminosity of the left and right set of the LED toggle pair. The LED pair 410 shows the left LED turned on and the right LED turned off. Alternatively, the LED pair 412 shows the left LED turned off and the right LED turned on. In the diagram shown in FIG. 4, Time (t) is on the X-axis. Upon sensing a signal (s), the toggle pair switches (Left (L) or Right (R)) which one is off and which is on. The transition time is shown here magnified for illustration purposes, but in reality, it is vanishingly small.

FIG. 5 provides an exemplary embodiment of the SRD system illustrating an LED Toggle pair 514 516 connected to the audio sensor 510 (a sensor apparatus) via the microcontroller 512. The LED toggle pair 514 516 acts as one unit to transmit a signal. In the LED toggle pair, one of the LED, between 514 and 516, in the pair is on while the other is off. To transmit a signal, the system switches which of the pair is on and which is off.

There are several benefits to this switching mechanism. First, it simplifies deployment and management of the devices, since an operator can always determine the device is on and functioning due to one of the pairs of LED arrays always being on. Secondly, it enables the invention to be auto-calibrating. The visual sensor device (described below) will always have an estimate of light level and black level. If those levels ever get too close, the system can sense an error in calibration. Third, it produces a more powerful signal.

LED Toggle Arrays

Figure 6:
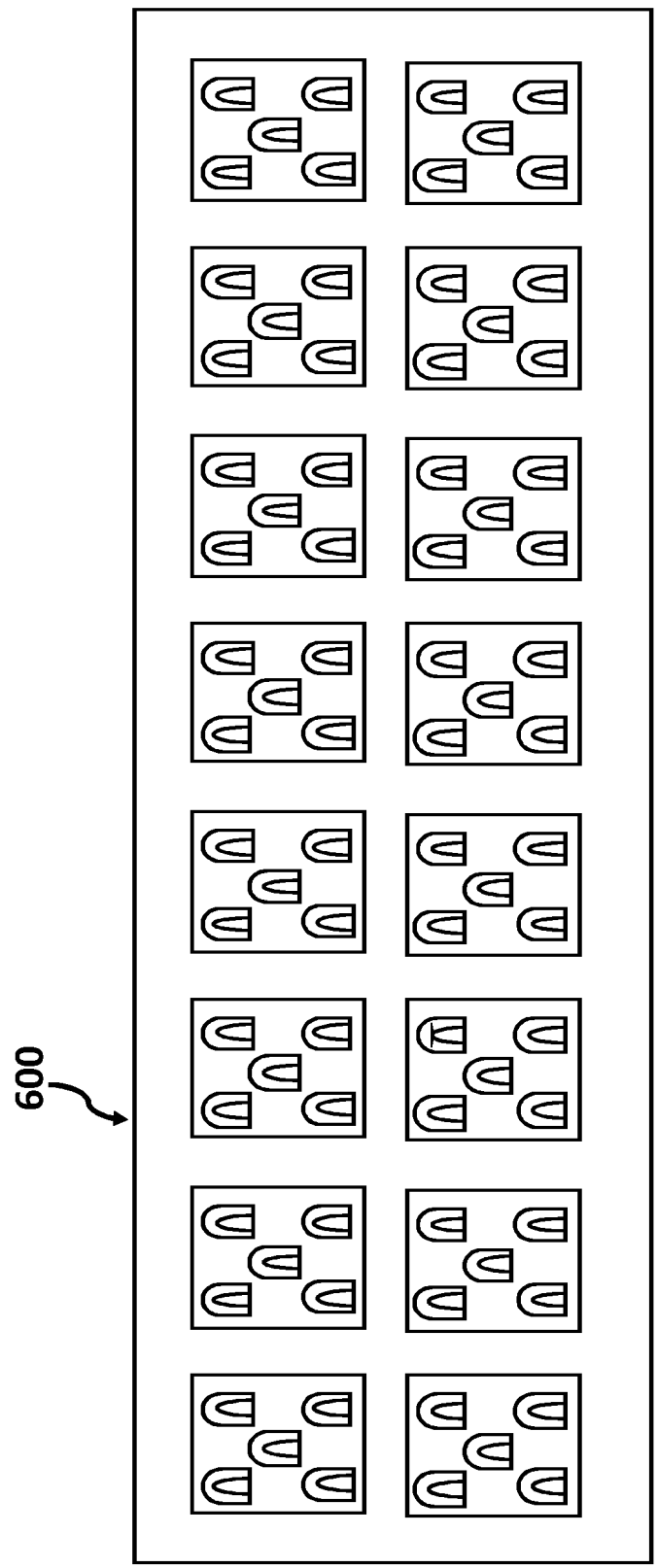
FIG. 6 provides an exemplary toggle light pair array.
Figure 7:
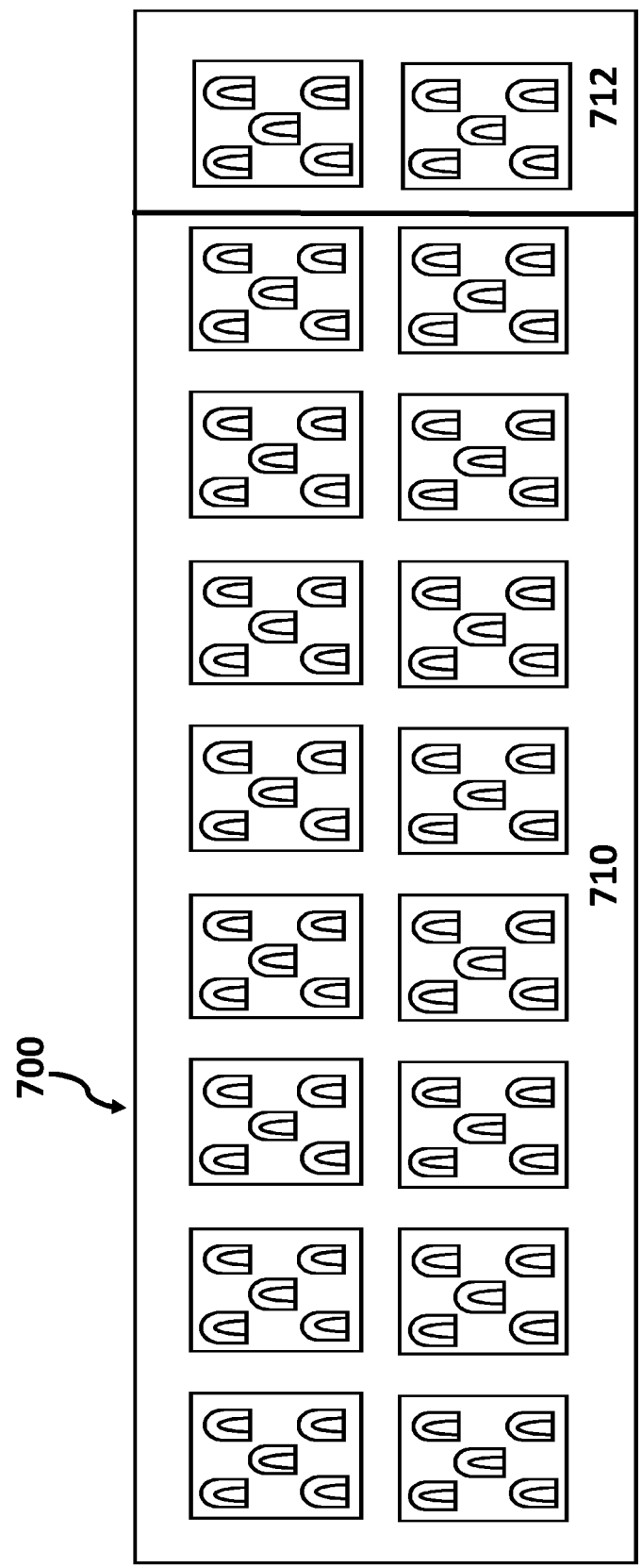
FIG. 7 provides an exemplary toggle light pair array with a parity pair.

FIG. 6 provides an exemplary LED toggle array 600. LED Toggle pair array 600 can be chained together and operating in tandem to transmit on byte of information. FIG. 7 provides an exemplary LED toggle array 700 comprising 8-bit LED Toggle array 710 plus a parity bit 712. The 9th bit acts as a parity bit 712, enhancing the error detection capabilities of the invention and information transmission capability.

It should be clear that the LED toggle pair described previously can be operated to transmit a single piece of information, or chained together to send more complex signals or information. For instance, 8 toggle pairs can operate together to transmit a byte of information (as shown in FIG. 6). Furthermore, we can add a 9th LED toggle pair (as shown in FIG. 7) to the array to act as a parity bit, further increasing error detection.

Camera Device

The camera device may be used to receive the signal sent by the TD described in the previous sections. The camera device may be positioned to detect the transmission device. The camera device may be an analog or IP CCTV camera situated on the ceiling or otherwise in an overhead location. Other camera positions and camera embodiments are also possible.

Visual Differentiator Device

The visual differentiator device may receive the signal from the camera device. In the case of an analog camera, the visual differentiator device may further comprise of a DAC of some sort to digitize the signal and convert it into a digital format. For the case of an IP camera, the signal is received directly to the central computing device.

The visual differentiator device may extract and interpret the signal generated by the transmission device present in the video recorded and sent by the camera device. The extraction process may be dependent on the embodiment of the TD. In one embodiment, to extract a light level sent by the TD, the region within the one or more image of the video in which the light is projected is extracted, and the intensity of the pixels is summed together to create an aggregate measure.

In another embodiment, multiple images are used to interpret a time-varying signal from the TD. As a non-limiting example, if it is known that the signal sent from the TD will flash for 250 ms, then a time window of 250 ms can be used within the video stream and the pixels can be summed up over a sliding window of 250 ms in order to determine an intensity score. The intensity of this sliding window can then be interpreted, for example, by a threshold, in order to determine whether a flash was sent or not from the TD.

In another embodiment, to extract the signal sent by a TD configured as a toggle pair, in which one LED array is always on and the other off, or vice-versa, the following process can be used. The areas in the image capturing each LED array, for example, Array 1 and Array 2 are first extracted by cropping operations. The pixel values are then aggregated to arrive at intensity scores S1 and S2, one for each array A1 and A2. The ratio R=S1/S2 is computed. If R>1, then A1 is "on" and A2 is "off". If R<1, then A1 is "off" and A2 is "on". It may be the case that S1 is close to S2. This can be seen by a computing a symmetric ratio Rs (Rs=R if R>1). Otherwise, Rs=1/R. This guarantees Rs>=1. Now, if Rs is too small or too close to 1, this indicates a lack of fidelity in determining the signal sent by the TD. Perhaps the TD array got physically moved, perhaps the camera got moved, or perhaps the TD is covered by something or is otherwise not operating correctly. All of these can be accounted for by an Rs ratio that is too low. By way of a nonlimiting example, the validity threshold on the ratio Rs can be set to 2.0. What this means is that if the intensity of the lit LED array is under two times than intensity of the unlit array, an error condition is determined.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth. Thus, it is to be understood that the present invention may therefore be practiced otherwise than as specifically described above. Many other modifications, variations, applications, and alterations of the present disclosure will be ascertainable to those having ordinary skill in the art. The above-cited patents and patent publications are hereby incorporated by reference in their entirety.

Those skilled in the art will readily observe that numerous modifications, applications and alterations of the device and method may be made while retaining the teachings of the present invention.

What is claimed is:

1. A signal retransmission device for converting an environmental signal at a checkout terminal to a transmission signal, comprising:
   a sensor apparatus detecting the environmental signal present around the checkout terminal during a transaction associated with a checkout at the checkout terminal, the sensor apparatus operatively in communication with a controller, wherein the sensor apparatus registers a change in voltage upon detection of the environmental signal, wherein the environmental signal is generated by the checkout terminal when an item is detected by the scanner during the transaction;
   a transmission device, operatively in communication with the controller, wherein the transmission device generates the transmission signal as a response to the environmental signal detected by the sensor apparatus; and
   the controller analyzing the change in voltage to the detected environmental signal based on a predetermined voltage change associated with a predetermined transmission signal to determine the transmission signal and to validate the detected environmental signal, a plurality of the predetermined change to transmission associations being stored at a storage unit;
   wherein the transmission signal adapted to be captured in multiple images by a camera during the checkout;
   wherein a scanner status that was originally communicated by the scanner through the environment signal is extracted from the multiple images and correlated with the item, the transaction, and the checkout;
   wherein the controller is adapted to monitor the transmission device from the transmission signal based on an estimated light level and black level detected in the multiple images and automatically calibrate the transmission device when the light level and the black level are outside the estimated light level and black level, wherein the transmission device comprises pairs of light emitting diodes (LEDS), and wherein at least at least one of the pairs is always on, wherein a determination as to which pair is on and which pair is off is based on pixel intensity scores and ratios of the intensity scores between the pairs, wherein when a given ratio of intensity is greater than 1 the corresponding pair associated with a numerator in the given ratio is on and the corresponding pair associated with the denominator is off, and when a corresponding ratio approaches 1 an error condition is raised indicating a problem was detected for the transmission device.

2. The signal retransmission device of claim 1, wherein the controller actuates the transmission device.

3. The signal retransmission device of claim 1, wherein the sensor apparatus is a light sensor.

4. The signal transmission device of claim 1, wherein the sensor apparatus is an optical sensor and the environmental signal is a change in optical state.

5. The signal transmission device of claim 1, wherein the pairs of LED arrays comprise two light arrays, each having a corresponding pair of LEDs, each of the two light arrays being activated alternatively.

6. The signal transmission device of claim 1, wherein the pairs of LED arrays are operated as a light toggle array.

7. The signal transmission device of claim 1, wherein intensity of the transmission signal is controlled by the controller based on the detected environmental signal.

8. The signal transmission device of claim 7, wherein the intensity of the transmission signal reflects intensity of the environmental signal.

9. The signal transmission device of claim 1, wherein the transmission device is actuated for a predetermined duration of time.

10. The signal transmission device of claim 1, wherein the transmission signal indicates a transaction status of the item being transacted at the checkout terminal for the transaction.

11. The signal transmission device of claim 1, wherein the pairs of LED arrays include a parity bit.

12. A system for verifying a transaction at a checkout terminal by converting an audible environmental signal to a transmission signal, the checkout terminal in communication with a processor and a memory, comprising:
   an audio sensor detecting the audible environmental signal generated during the transaction of an item at the checkout terminal as the audible environmental signal is generated by the checkout terminal when the item is scanned by a barcode scanner of the checkout terminal, the audio sensor operatively in communication with the processor, wherein the audible environment signal representing a scanner status associated with the barcode scanner when the item is detected by the barcode scanner during the transaction;
   a transmission device, operatively in communication with the processor, wherein the transmission device generates the transmission signal as a response to the audible environmental signal detected by the audio sensor; and
   a camera device, operatively in communication with a computing device, positioned to record the transmission signal in multiple images during the transaction, wherein the computing device verifies the transaction based on the recorded transmission signal, extracts the scanner status as the audible environmental signal from the recorded transmission signal depicted in the multiple images, and correlates the recorded transmission signal with the item and the transaction;
   wherein the transmission device is monitored from the transmission signal based on an estimated light level and black level detected in the multiple images and the transmission device is automatically calibrate when the light level and the black level are outside the estimated light level and black level, wherein the transmission device comprises pairs of light emitting diodes (LEDS), and wherein at least at least one of the pairs is always on, wherein a determination as to which pair is on and which pair is off is based on pixel intensity scores and ratios of the intensity scores between the pairs, wherein when a given ratio of intensity is greater than 1 the corresponding pair associated with a numerator in the given ratio is on and the corresponding pair associated with the denominator is off, and when a corresponding ratio approaches 1 an error condition is raised indicating a problem was detected for the transmission device.

13. The system of claim 12, wherein the transmission signal is a light signal.

14. The system of claim 13 further comprising a visual differentiator device configured to extract a signal from the recorded light signal.

15. The system of claim 14, wherein the extracted signal is correlated to a transaction data identified by the barcode scanner.

16. The system of claim 14, wherein the visual differentiator device is configured to:
- keep track of changes in state of the recorded light signal; and
- detect the changes in state of the recorded light signal.

17. The system of claim 14, wherein the visual differentiator device is configured to:
- receive at least one image from the video camera;
- extract at least one bounding area in the image including a light toggle array within the camera device's field of view; and
- detect activation of at least one of the pairs of LED arrays from pixels of the bounding area.

18. The system of claim 12, wherein the computing device verifies the transaction by comparing the transmission signal against a predetermined threshold value stored by a storage unit, the storage unit operatively in communication with the computing device.

* * * * *

UNITED STATES PATENT AND TRADEMARK OFFICE
CERTIFICATE OF CORRECTION

PATENT NO. : 11,972,409 B2  
APPLICATION NO. : 16/022593  
DATED : April 30, 2024  
INVENTOR(S) : Srinivasan et al.

Page 1 of 1

It is certified that error appears in the above-identified patent and that said Letters Patent is hereby corrected as shown below:

On the Title Page

Item (54), in "Title", in Column 1, Line 2, delete "LOST" and insert --LOSS-- therefor In the Specification In Column 1, Line 2, delete "LOST" and insert --LOSS-- therefor In the Claims In Column 15, Lines 50-51, in Claim 1, delete "at least at least" and insert --at least-- therefor In Column 16, Line 55, in Claim 12, delete "at least at least" and insert --at least-- therefor Signed and Sealed this  
Third Day of June, 2025

Coke Morgan Stewart  
*Acting Director of the United States Patent and Trademark Office*